United States Patent
Mingels et al.

(12)

(10) Patent No.: US 6,479,029 B1
(45) Date of Patent: Nov. 12, 2002

(54) MICRONIZED ALKALINE EARTH METAL CARBONATE

(75) Inventors: Norbert Mingels, Dinslaken; Karl Koehler, Diekholzen; Jai Won Park, Goettingen; Hans Gabel, Kasbach, all of (DE)

(73) Assignee: Solvay Barium Strontium GmbH, Hannover (DE)

( * ) Notice: Subject to any disclaimer, the term of this patent is extended or adjusted under 35 U.S.C. 154(b) by 0 days.

(21) Appl. No.: 09/065,067

(22) PCT Filed: Oct. 22, 1996

(86) PCT No.: PCT/DE96/02006

§ 371 (c)(1),
(2), (4) Date: Jun. 3, 1998

(87) PCT Pub. No.: WO97/15530

PCT Pub. Date: May 1, 1997

(30) Foreign Application Priority Data

Oct. 26, 1995 (DE) .......................................... 195 39 813
Dec. 21, 1995 (DE) .......................................... 195 48 131

(51) Int. Cl.⁷ ............................................... C01F 11/18
(52) U.S. Cl. ...................................... 423/432; 423/165
(58) Field of Search .................................. 423/155, 158, 423/160, 161, 165, 430, 432, 414, 415.1, 419.1

(56) References Cited

U.S. PATENT DOCUMENTS 2,058,503 A    10/1936  Rafton et al. ............... 423/432
2,188,663 A  *  1/1940  McClure et al. ............. 423/432
2,964,382 A  * 12/1960  Hall, Jr. ...................... 423/432
3,920,800 A    11/1975  Harris ........................ 423/432
4,018,877 A  *  4/1977  Woode ........................ 423/432
5,059,407 A  * 10/1991  Wallace et al. .............. 423/421

FOREIGN PATENT DOCUMENTS

JP    7-25611    *  1/1995   ........... C01F/11/18
JP    7025611    *  1/1995   ........... C01F/11/18

OTHER PUBLICATIONS

Abstract of Japanese Patent Publication No. JP 59–223225.
Abstract of Japanese Patent Publication No. JP 54–50499.
Abstract of Japanese Patent Publication No. JP 56–160322.

* cited by examiner

Primary Examiner—Stuart L. Hendrickson
Assistant Examiner—Eileen E. Nave
(74) Attorney, Agent, or Firm—Crowell & Moring LLP

(57) ABSTRACT

The invention concerns a micronized alkaline earth metal carbonate prepared with or without the use of an agent preventing crystal growth, and a process for its preparation and use. The prepared micronized calcium carbonate, barium carbonate with a BET surface area ranging from 3 to 30 $m^2/g$ or strontium carbonate with a BET surface area ranging from 3 to 50 $m^2/g$ is suitable in particular for preparing capacitors, thermistors and other oxide ceramic electrical components containing calcium oxide, barium oxide or strontium oxide, and high-temperature superconductors. Ammonium salts or alkylammonium salts of carboxylic acids having a total of between 3 and 12 carbon atoms and at least two COOH groups or at least two OH groups, e.g. salts of maleic acid or nitric acid, are used as agents preventing crystal growth.

20 Claims, No Drawings

MICRONIZED ALKALINE EARTH METAL CARBONATE

The invention relates to an alkaline earth metal carbonate in particle form, and to its production and its use.

Calcium carbonate, barium carbonate and strontium carbonate are used for many technical purposes, for example as starting material for the synthesis of other calcium, strontium and barium compounds. The carbonates are suitable also for use in solid reactions, such as the preparation of oxide-contain ceramic materials for electrical and magnetic applications, e.g., for the manufacture of thermistors and condensers; they are used for the production of glass and for the manufacture of high-temperature superconducting material. Calcium carbonate is also used in paper manufacture.

Japanese patent application 7/025611 discloses a micronized barium carbonate which has a surface area of 5 to 25 $m^2/g$. For its production an aqueous solution of barium hydroxide, to which carbon dioxide is added, is passed through three pumps in tandem and adds to the reaction product leaving the third pump a carboxylic acid or carboxylic acid derivative such as carboxymethylcellulose, which is intended to prevent crystal growth.

The present invention is addressed to the problem of devising an effective method for the preparation of micronized calcium carbonates, barium carbonates and strontium carbonates in the form. of particles with a narrow grain distribution. This problem is solved by the method of the invention.

The method of die invention for the preparation of particulate alkaline earth carbonate $MCO_3$, wherein M represents Ca, Sr or Ba, provides for adding carbon dioxide to an $M(OH)_2$ solution with a concentration of 0.1 to 0.75 mol/l of M(OH), with the formation of a reaction mixture, using about 2 to 30 l of carbon dioxide gas per liter of solution, passing the reaction mixture through a continuously running mixing reactor in which shearing, thrusting and friction forces of interacting tools with a high relative velocity act upon the reaction mixture according to the rotor-stator principle, and separating and drying the alkaline earth carbonate formed from the reaction mixture after it passes through the reactor. The shearing, thrusting and friction forces in the reactor bring it about that the carbon dioxide enters in extremely finely divided form into the alkaline earth metal hydroxide solution. The liters of the carbon dioxide gas referred to are liters under standard conditions.

In the practice of the method of the invention micronized alkaline earth metal carbonate is obtained in which at least 90% of the particles have a diameter ranging from 0.1 to 1.0 $\mu$m, preferably ranging from 0.2 to 1.0 $\mu$m in the case of barium carbonate or strontium carbonate. In the case of calcium carbonate, at least 90% of the particles have a diameter ranging from 0.2 to 1.0 $\mu$m. In barium carbonate the BET surface area ranges from 3 to 30 $m^2/g$, preferably 3 to 20 $m^2/g$, especially 8 to 15 $m^2/g$. In calcium carbonate and strontium carbonate the surface area ranges from 3 to 50 $m^2/g$.

The method of the invention is very efective. Only one reactor is needed in order to achieve a virtually quantitative reaction. In the method of the state of the art, three pumps are used in tandem.

Very suitable are apparatus in which the rotor revolves at a high speed. The rotor speed amounts preferably to 2,000 to 8,000 revolutions per second. The time of stay of the reaction mixture in the mixing and homogenizing apparatus amounts preferably up to 5 sec.

In this manner, $BaCO_3$ for example, can be produced, wherein 90% and more of the particles have a diameter ranging from 0.2 to 0.7 $\mu$m.

Measurement of the BET surface area was performed with an apparatus able to measure micropores, of the firm, Micro Meritics. Adsorption gas was nitrogen, and the measurement was made at the temperature of liquid nitrogen in the range of 0.01–0.1 $P_{rel}$ using the BET equation.

In one embodiment of the invention the method is practiced without the addition of a crystal growth inhibitor This embodiment will be further explained in connection with the preferred production of $BaCO_3$.

Before the drying operation, which is best performed in the range of 100 to 120° C., the barium carbonate separated immediately after passing through the reactor, can be washed one or more times with water.

The precipitation of barium carbonate in the barium hydroxide solution treated with carbon dioxide is best performed at a temperature in the range from 40 to 130° C.

The addition of agents intended to prevent crystal growth in the reaction mixture leaving the homogenizer is not performed; the carbonate is separated immediately after leaving the reactor.

Additional subject matter of the invention is the particulate barium carbonate, which is obtainable by the method of the invention and has a BET surface in the range of 3 to 30 $m^2/g$, preferably 3 to 20 $m^2/g$, especially 8 to 15 $m^2/g$, in which at least 90% of the particle has a diameter ranging from 0.2 to 1.0 $\mu$m, and which is free of agents preventing crystal growth.

Additional subject matter of the invention is particulate calcium carbonate with a BET surface ranging from 3 to 50 $m^2/g$, wherein at least 90% of the particles has a diameter ranging from 0.1 to 1.0 $\mu$m, preferably 0.2 to 1.0 $\mu$m, obtained by the method of the invention, which is free of agents preventing crystal growth.

Subject matter of the invention is also particulate strontium carbonate with a BET surface ranging from 3 to 50 $m^2/g$, wherein at least 90% of the particles has a diameter ranging from 0.1 to 1.0 $\mu$m, obtained by the method of the invention, which is free of agents preventing crystal growth.

Another embodiment of the invention provides that an agent preventing crystal growth is added to the reaction mixture before, during and/or after the reaction in the reactor. In this embodiment also, calcium, strontium and barium carbonates can be made with the above-mentioned characteristic of particle diameter and specific BET surface area. It is preferentially suited for the preparation of barium carbonate and strontium carbonate. This preferred embodiment will he further explained; special crystal growth inhibiting agents are used which are given preference. Also usable would be the acids themselves or the alkali metal salts, for example.

The particles occur in rod shapes. The statement of the diameter of the particles relates to the length of the rods.

The preferred method of the invention for the preparation of particulate barium carbonate with a BET surface area ranging from 3 to 30 $m^2/g$, preferably 3 to 20 $m^2/g$ and strontium carbonate with a BET surface ranging from 3 to 50 $m^2/g$, wherein at least 95%, preferably at least 90%, and especially 100% of the particles have a diameter $\leq$1.0 $\mu$m, provides that, with the use of an agent preventing crystal growth selected from the group of the ammonium salts and alkyl ammonium salts of carboxylic acid having a total of 3 to 12 carbon atoms as well as at least 2 COOH groups, or at least 2 OH groups, a barium hydroxide solution or strontium hydroxide solution with a concentration of 0.1 to 0.75 mol/l of $Ba(OH)_2$ or $Sr(OH)_2$, respectively, is treated with carbon dioxide with the formation of a reaction mixture, using about 2 to 30 l of carbon dioxide gas per liter of solution, the reaction mixture is passed through a mixing reactor in which shear and friction forces act upon the reaction mixture. The shear and friction force in the reactor cause the carbon dioxide to enter in extremely finely divided form into the barium or strontium hydroxide solution. The liter specification (mainly 10 to 20 l in the processes) of the carbon dioxide gas refers to standard conditions. If 100% of all particles have a diameter $\leq 1$ $\mu$m, this means that no more than very minor undesired amounts, e.g., less than 0.1% of the particles, have a diameter greater than 1 $\mu$m.

The agent preventing crystal growth is used at least in the amount that limits the crystal growth of the barium carbonate and strontium carbonate such it at least 99% of the particles have a diameter of $\leq 1$ $\mu$m, e.g., in the range from 0.2 to 1.0 $\mu$m. The amount of the agent can best be at least 0.01 wt.-%, preferably at least 0.1 wt.-% of the $BaCO_3$ taken as 100 wt.-%, or $SrCO_3$, as the case may be (dry substance). It can, for example, be in the range from 0.01 to 5 wt.-% of the barium carbonate or strontium carbonate taken as 100 wt.-%. Preferably, the carboxylic acid salt affecting crystallization is used in an amount of 0.2 to 0.7 wt.-% of the barium carbonate or strontium carbonate taken as 100 wt.-%. Since the carboxylic acid salt can be used before, during or after the carbonization, it is possible to reckon the amount of carbonate to which the carboxylic acid salt amount relates by assuming a 100% reaction of the barium hydroxide or strontium hydroxide.

With special preference, ammonium salts of the carboxylic acid are used. However, alkyl ammonium salts of the carboxylic acid can also be used; these can be primary, secondary, tertiary and quaternary alkyl ammonium salts. For example, primary, secondary and tertiary ammonium cations are suitable, the nitrogen atom being substituted by alkyl groups with a total of up to 18 carbon atoms. Methyl, dimethyl, trimethyl, ethyl, diethyl, triethyl, n-propyl, di-n-propyl and tri-n-propyl ammonium salts, as well as ammonium cations with different alkyl groups as substituents, are usable, for example.

Salts of carboxylic acids with a total of 3 to 12 carbon atoms, preferably 3 to 6 carbon atoms, are used, as stated; the carbon atoms of the carboxyl group are included. Especially well suited are ammonium and alkylammonium salts of malic acid, adipic acid, citric acid, gluconic acid, glucaric acid, glucuronic acid, tartaric acid and maleic acid. Preferred are the ammonium salts, especially citric and maleic acid. The invention shall be further explained with the aid of this preferred embodiment.

Ammonium salts of citric acid and maleic acid are used preferentially, as stated, especially those ammonium salts of citric acid and maleic acid which, when in aqueous solution, result in a pH ranging from 6 to 8. They can be prepared by adding ammonia or spirit of saimiac, until a pH ranging from 6 to 8 is reached.

The citrate salt or malcate salt is advantageously used in the form of an aqueous solution. The citrate or maleate concentration amounts advantageously to at least 10 wt.-%. It can even have a saturated concentration.

It is preferred that the carboxylic acid salt be admixed immediately after the reaction mixture has passed through the apparatus used for the carbonization. Thus the formation of undesirably large crystals of barium carbonate or strontium carbonate is especially effectively prevented. The immediate separation of the carbonate is not necessary.

Before the drying, which is best performed in the range of 100 to 1 50° C., the carbonate separated after passing through the homogenizer can be washed one or more times with water. Thus, ammonium salts (e.g., carbonates of ammonium or alkyl ammonium) are washed out.

The precipitation of barium carbonate in the barium hydroxide solution treated with carbon dioxide is best performed at a temperature ranging from room temperature (e.g., 25° C.) to 130° C., and likewise the precipitation of strontium carbonate.

Additional subject matter of the invention is particulate barium carbonate, which is obtainable by the method of the invention with the addition of an agent preventing crystal growth and has a BET surface ranging from 3 to 30 $m^2/g$, preferably 3 to 20 $m^2/g$, at which at least 95% of the particles have a diameter $\leq 1.0$ $\mu$m. Accordingly, subject matter of the invention is particulate $CaCO_3$ and $SrCO_3$ with a distribution of the particle diameter that has a specific surface area of 3 to 50 $m^2/g$, having been produced with the addition of an agent preventing crystal growth. Preferably, at least 99% of the $CaCO_3$ or $BaCO_3$ particles or $SrCO_3$ particles has a diameter of $\leq 1.0$ $\mu$m. The grain size determination is performed with a sedigraph.

The calcium, barium or strontium carbonate can be used very well for all purposes for which these carbonates are used technically.

The micronized calcium, barium and strontium carbonates are well suited for use in solid reactions. The carbonates can be used advantageously, for example, in those solid reactions in which they are reacted, usually with other solid components, by sintering or fusion, yielding carbon dioxide. For example, the carbonates can be used for the production of ceramic oxide components containing BaO or SrO for electrical or magnetic applications, e.g., for the manufacture of thermistors and condensers, and also in the production of ceramic oxide superconductors. Barium carbonate is suitable, for example, for the production of yttrium barium cuprate superconductor material, and strontium carbonate and calcium carbonate for the production of ceramic oxide superconductors containing bismuth. In the preparation of ceramic oxide, e.g., in the preparation of barium titanates, barium niobates or barium ferrites, a high activity of the micronized carbonate is observed. Similar effects with the micronized strontium carbonate are seen in the production of ceramic oxide containing strontium. Of course, the carbonates can also be used for other common purposes, for example in glass manufacture or in the production of other calcium, barium and strontium compounds.

With the addition of an agent preventing crystal growth the method has the advantage that the suspension of calcium, strontium or barium carbonate does not have to be processed immediately, but can be left standing for days, if desired, without any observable crystal growth.

The following examples are intended to further explain the invention without limiting its scope.

EXAMPLE 1
Preparation of Micronized Barium Carbonate

Barium sulfide from the reduction of barium sulfate with carbon was leached out with water. The resulting barium hydroxide leachate had a concentration of $Ba(OH)_2$ of about 0.34 mol/l. The temperature was about 50° C. 400 l per hour of this leachate plus 6 $m^3$/h of carbon dioxide preheated to 50° C. were passed through a mixer operating on the rotor-stator principle. The shear and friction forces produced in this mixer by the interacting tools on the precipitating barium carbonate had the effect of forming very small particles of barium carbonate. The barium carbonate suspension leaving the homogenizer without any post-reaction was washed with deionized water, centrifuged to separate the solids, and dried at about 110° C. The addition of an agent preventing crystal growth did not take place.

The product obtained was tested for BET surface area and particle size distribution. The average BET surface area was 9.8 m²/g; in regard to the particle size distribution it was found that 90% of the particles were in the range of 0.2 to 0.7 μm.

EXAMPLE 2

Example was repeated with a leachate concentration of 0.5 mol per liter. The result was the same as that obtained in Example 1.

EXAMPLE 3

Example 1 was repeated, and this time the temperature of the leachate and carbon dioxide prior to contacting was 80° C. The result obtained was the same as obtained in Example 1.

EXAMPLE 4

Preparation of micronized barium carbonate; ammonium citrate concentration in the product: 0.5 wt.-% of the $BaCO_3$ taken as 100 wt.-%.
Preparation of the Ammonium Citrate Solution:

930 g of citric acid was dissolved in 2 l of deionized water and a salmiac solution containing 25 wt.-% of $NH_3$ was added until a pH of 6.8 was reached (approximately one liter of the salmiac solution was used for the purpose).
Preparation of the $Ba(OH)_2$ Solution and Carbonization Barium sulfide from the reduction of barium sulfate with carbon was leached out with water. The resultant barium hydroxide leachate was adjusted to a $Ba(OH)_2$ concentration of about 0.34 mol/l. The temperature was about 50° C. 400 liters per hour of this leachate and 6 m³ per hour of carbon dioxide preheated to 50° C. were passed through a homogenizer. The shear and friction forces exercised in this homogenizer has the effect on the precipitating barium carbonate that very small particles of barium carbonate are formed. The barium carbonate suspension leaving the homogenizer was trated with the ammonium citrate solution. The amount of the solution was made such that 0.5 wt.-% of citrate salt with respect to the $BaCO_3$ taken as 100% was contained in the finished product. The mixture of $BaCO_3$ suspension and citrate solution was then washed with deionized water, centrifuged to remove the water and dried at about 130° C. Then the product was ground.

The product was tested for BET surface area and particle size distribution. The average BET surface was 11 m²/g and in regard to the particle size distribution it was found that 90% of the particles were ≦0.4 μm, 100% ≦0.7 μm.

EXAMPLE 5

Citrate concentration in the product: 2.0 wt.-% with $BaCO_3$ taken as 100 wt.-%.

Example 4 was repeated, setting a citrate concentration of 2.0 wt.-% in the product. The product corresponded to the product obtained in Example 4.

EXAMPLE 6

Citrate concentration in the product: 0.2 wt.-%.

Example 4 was repeated, and this time the citrate concentration in the finished product was set at 0.2 wt.-% citrate salt with $BaCO_3$ taken as 100 wt-%. The product obtained corresponded to the product obtained in Example 4.

EXAMPLE 7

Preparation of micronized $BaCO_3$ ssing ammonium maleate.
Preparation of the Maleate Solution:

A salmiac solution containing 25 wt.-% of $NH_3$ was poured into an aqueous solution containing 30 wt.-% of maleic acid until a pH of 6.8 was reached.

The rest of the procedure was the sane as in Example 4. The micronized $BaCO_3$ was comparable to the product of Example 4, except that it contained barium maleate in the amount of 0.5 wt.-% with respect to the $BaCO_3$ taken as 100 wt.-%.

What is claimed is:

1. A method for preparing particulate alkaline earth metal carbonate $MCO_3$, comprising:

treating a solution having a concentration of 0.1 to 0.75 mole/l of $M(OH)_2$ with about 2 to 30 liters of $CO_2$ gas per liter of solution to form a reaction mixture, wherein M represents Ba or Sr;

passing the reaction mixture through a continuously operating mixing reactor in which shear and friction forces act on the reaction mixture;

precipitating $MCO_3$ particles;

separating and drying the $MCO_3$ particles, wherein at least 95% of the $MCO_3$ particles have a diameter of ≦1.0 μm.

2. A method according to claim 1, wherein the $MCO_3$ particles comprise $BaCO_3$.

3. A method according to claim 1, further comprising washing the $MCO_3$ particles at least once with water before said drying.

4. A method according to claim 1, wherein said precipitating is at a temperature from 0° C. to 130° C.

5. A method according to claim 4, wherein said precipitating is at a temperature from 40° C. to 130° C.

6. A method according to claim 1, wherein said operating mixing reactor comprises a rotor operating at a speed between 2,000 to 8,000 rpm.

7. A method according to claim 1, further comprising adding an agent to prevent crystal growth before or after said precipitating.

8. A method according to claim 7, wherein said agent is an ammonium salt or an alkyl ammonium salt of a carboxylic acid having a total of 3 to 12 C atoms and at least 2 COOH groups or at least 2 OH groups.

9. A method according to claim 8, wherein the carboxylic acid is selected from the group consisting of citric acid, malic acid, adipic acid, gluconic acid, glucaric acid, glucuronic acid, tartaric acid and maleic acid.

10. A method according to claim 9, wherein the carboxylic acid is citric acid or maleic acid.

11. A method according to claim 8, wherein said agent is ammonium citrate or ammonium maleate produced by introducing $NH_3$ into, or adding aqueous $NH_2$ solution to, an aqueous citric acid solution or maleic acid solution until a pH of 6 to 8 has been reached.

12. A method according to claim 8, wherein the ammonium salt or the alkyl ammonium salt is in the form of an aqueous solution.

13. A method according to claim 8, wherein the ammonium salt or the alkyl ammonium salt is added in an amount of at least 0.01 wt. % with respect to the $MCO_3$ particles or the $MCO_3$ particles to be prepared.

14. A method according to claim 13, wherein the ammonium salt or the alkyl ammonium salt is added in an amount of 0.01 to 5 wt. % with respect to the $MCO_3$ particles or the $MCO_3$ particles to be prepared.

15. A method according to claim 8, wherein the ammonium salt or the alkyl ammonium salt is added immediately after passing the reaction mixture through the reactor.

16. A method for preparing particulate alkaline earth metal carbonate $MCO_3$, consisting of:

treating a solution having a concentration of 0.1 to 0.75 mole/l of $M(OH)_2$ with about 2 to 30 liters of $CO_2$ gas per liter of solution to form a reaction mixture, wherein M represents Ba or Sr;

passing the reaction mixture through a continuously operating mixing reactor in which shear and friction forces act on the reaction mixture;

precipitating $MCO_3$ particles;

separating the $MCO_3$ particles;

optionally washing the $MCO_3$ particles one at least once with water; and drying the $MCO_3$ particles.

wherein at least 95% of the $MCO_3$ particles have a diameter of $\leq 1.0$ μm.

17. A method for preparing particulate alkaline earth metal carbonate $MCO_3$, consisting of:

treating a solution having a concentration of 0.1 to 0.75 mole/l of $M(OH)_2$ with about 2 to 30 liters of $CO_2$ gas per liter of solution to form a reaction mixture, wherein M represents Ba or Sr;

passing the reaction mixture through a continuously operating mixing reactor in which shear and friction forces act on the reaction mixture;

precipitating $MCO_3$ particles;

adding an agent to prevent crystal growth before or after said precipitating; and separating and drying the $MCO_3$ particles, wherein at least 95% of the $MCO_3$ particles have a diameter of $\leq 1.0$ μm.

18. A method for preparing particulate alkaline earth metal carbonate $MCO_3$, comprising:

treating a solution having a concentration of 0.1 to 0.75 mole/l of $M(OH)_2$ with about 2 to 30 liters of $CO_2$ gas per liter of solution to form a reaction mixture, wherein M represents Ba or Sr;

passing the reaction mixture through a continuously operating mixing reactor for up to 5 seconds in which shear and friction forces act on the reaction mixture;

precipitating $MCO_3$ particles; and separating and drying the $MCO_3$ particles, wherein at least 95% of the $MCO_3$ particles have a diameter of $\leq 1.0$ μm.

19. A method for preparing particulate alkaline earth metal carbonate $MCO_3$, comprising:

providing a solution having a concentration of 0.1 to 0.75 mole/l of $M(OH)_2$, wherein M represents Ba or Sr;

adding about 2 to 30 liters of $CO_2$ gas per liter of said solution to form a reaction mixture;

passing the reaction mixture through a continuously operating mixing reactor in which shear and friction forces act on the reaction mixture;

precipitating $MCO_3$ particles; and separating and drying the $MCO_3$ particles, wherein at least 95% of the $MCO_3$ particles have a diameter of $\leq 1.0$ μm.

20. A method for preparing particulate alkaline earth metal carbonate $MCO_3$, comprising:

providing a solution having a concentration of 0.1 to 0.75 mole/l of $M(OH)_2$, wherein M represents Ba or Sr;

adding about 2 to 30 liters of $CO_2$ gas per liter of said solution to form a reaction mixture;

passing the reaction mixture through a continuously operating mixing reactor in which shear and friction forces act on the reaction mixture;

precipitating $MCO_3$ particles; and separating and drying the $MCO_3$ particles, wherein at least 95% of the $MCO_3$ particles have a diameter of $\leq 1.0$ μm, and wherein the about 2 to 30 liters of $CO_2$ gas is added initially in gaseous form.

* * * * *